US010912289B2

United States Patent
Kawamura et al.

(10) Patent No.: US 10,912,289 B2
(45) Date of Patent: Feb. 9, 2021

(54) FISHING ROD HAVING ROD BODY WITH FITTING MOUNTED THEREON, TUBULAR BODY HAVING THE FITTING MOUNTED THEREON, AND METHOD FOR MANUFACTURING THEM

(71) Applicant: GLOBERIDE, Inc., Tokyo (JP)

(72) Inventors: Takuji Kawamura, Tokyo (JP); Nobuhiro Izaki, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 332 days.

(21) Appl. No.: 15/920,098

(22) Filed: Mar. 13, 2018

(65) Prior Publication Data
US 2018/0263229 A1    Sep. 20, 2018

(30) Foreign Application Priority Data

Mar. 14, 2017   (JP) ................................. 2017-049054

(51) Int. Cl.
*A01K 87/04*    (2006.01)
*B32B 1/08*    (2006.01)
(Continued)

(52) U.S. Cl.
CPC .............. *A01K 87/04* (2013.01); *A01K 87/06* (2013.01); *B29C 65/02* (2013.01);
(Continued)

(58) Field of Classification Search
CPC ........ A01K 87/00; A01K 87/02; A01K 87/04; A01K 87/06
(Continued)

(56) References Cited

U.S. PATENT DOCUMENTS

2005/0223617 A1* 10/2005 Morita ................... A01K 87/00
                                                    43/18.5
2009/0077857 A1*  3/2009 Lee ........................ A01K 87/00
                                                    43/17
(Continued)

FOREIGN PATENT DOCUMENTS

CN         1665673 A    9/2005
CN       103200816 A    7/2013
(Continued)

OTHER PUBLICATIONS

Non-final Office Action Taiwanese Patent Application No. 107105369 dated Oct. 3, 2018 with English translation.

(Continued)

*Primary Examiner* — Darren W Ark
*Assistant Examiner* — William L Gmoser
(74) *Attorney, Agent, or Firm* — DLA Piper LLP (US)

(57) ABSTRACT

There is provided a fishing rod preventing or suppressing deviation or inclination of a fitting on a surface of a rod body. The fishing rod includes an elongated cylindrical rod body, a fitting having a mounting portion and mounted to an outer peripheral surface of the rod body via the mounting portion, a first layer formed by winding a first sheet so as to enclose the mounting portion and the rod body, the first sheet being made of a fiber-reinforced resin or a resin having a thermal shrinkage rate of 2.5% or lower, and a second layer formed by winding a second sheet made of a fiber-reinforced resin on an outer side of the first sheet, wherein a temperature at which a loss tangent of the first sheet has a maximum value is different from a temperature at which a loss tangent of the second sheet has a maximum value.

10 Claims, 7 Drawing Sheets

(51) Int. Cl.
| | |
|---|---|
| B32B 5/02 | (2006.01) |
| B32B 5/26 | (2006.01) |
| B32B 7/12 | (2006.01) |
| B32B 27/36 | (2006.01) |
| B32B 27/28 | (2006.01) |
| B32B 27/12 | (2006.01) |
| B32B 37/06 | (2006.01) |
| B32B 37/12 | (2006.01) |
| B32B 37/18 | (2006.01) |
| B32B 3/04 | (2006.01) |
| B29C 65/02 | (2006.01) |
| B29C 65/00 | (2006.01) |
| A01K 87/06 | (2006.01) |
| B29C 70/30 | (2006.01) |
| B29C 70/00 | (2006.01) |
| B29C 70/86 | (2006.01) |
| B29L 31/00 | (2006.01) |
| B29K 667/00 | (2006.01) |
| B29K 679/00 | (2006.01) |
| B29K 267/00 | (2006.01) |
| B29K 307/04 | (2006.01) |

(52) U.S. Cl.
CPC .......... *B29C 66/5326* (2013.01); *B29C 70/00* (2013.01); *B29C 70/30* (2013.01); *B29C 70/86* (2013.01); *B32B 1/08* (2013.01); *B32B 3/04* (2013.01); *B32B 5/022* (2013.01); *B32B 5/024* (2013.01); *B32B 5/26* (2013.01); *B32B 7/12* (2013.01); *B32B 27/12* (2013.01); *B32B 27/281* (2013.01); *B32B 27/36* (2013.01); *B32B 37/06* (2013.01); *B32B 37/12* (2013.01); *B32B 37/182* (2013.01); *B29K 2267/00* (2013.01); *B29K 2307/04* (2013.01); *B29K 2667/003* (2013.01); *B29K 2679/08* (2013.01); *B29L 2031/7002* (2013.01); *B32B 2260/021* (2013.01); *B32B 2260/023* (2013.01); *B32B 2260/046* (2013.01); *B32B 2262/0276* (2013.01); *B32B 2262/106* (2013.01); *B32B 2305/076* (2013.01); *B32B 2305/188* (2013.01); *B32B 2305/20* (2013.01); *B32B 2305/72* (2013.01); *B32B 2313/04* (2013.01); *B32B 2367/00* (2013.01); *B32B 2379/08* (2013.01); *B32B 2597/00* (2013.01)

(58) Field of Classification Search
USPC .............................. 43/18.1 R, 18.5, 22, 24
See application file for complete search history.

(56) References Cited

U.S. PATENT DOCUMENTS

| | | | |
|---|---|---|---|
| 2011/0274899 A1* | 11/2011 | Suzuki | B32B 27/08 428/212 |
| 2014/0004288 A1* | 1/2014 | Wakayama | C08L 23/12 428/41.3 |
| 2015/0296761 A1* | 10/2015 | Sugaya | A01K 99/00 43/24 |
| 2017/0182745 A1 | 6/2017 | Iwamoto et al. | |
| 2017/0182746 A1* | 6/2017 | Iwamoto | B32B 27/08 |
| 2017/0182747 A1 | 6/2017 | Iwamoto et al. | |
| 2017/0182748 A1 | 6/2017 | Iwamoto et al. | |
| 2017/0197395 A1 | 7/2017 | Iwamoto et al. | |
| 2017/0246842 A1 | 8/2017 | Iwamoto et al. | |
| 2017/0313033 A1 | 11/2017 | Iwamoto et al. | |
| 2018/0258324 A1* | 9/2018 | Tochihira | B32B 15/20 |
| 2020/0094529 A1 | 3/2020 | Iwamoto et al. | |

FOREIGN PATENT DOCUMENTS

| | | | |
|---|---|---|---|
| JP | 60-156963 U1 | 10/1985 | |
| JP | 02-026474 U1 | 2/1990 | |
| JP | 3114826 B2 | 12/2000 | |
| JP | 2004-194563 A | 7/2004 | |
| JP | 2008-263841 A | 11/2008 | |
| JP | 2012-029606 A | 2/2012 | |
| WO | WO-2015068610 A1 * | 5/2015 | ............... B32B 7/02 |
| WO | 2016/039471 A1 | 3/2016 | |

OTHER PUBLICATIONS

The First Chinese Office Action dated Jul. 24, 2020, of counterpart Chinese Application No. 201810153489.4, along with an English translation.

* cited by examiner

FISHING ROD HAVING ROD BODY WITH FITTING MOUNTED THEREON, TUBULAR BODY HAVING THE FITTING MOUNTED THEREON, AND METHOD FOR MANUFACTURING THEM

CROSS-REFERENCE TO RELATED APPLICATIONS

This application is based on and claims the benefit of priority from Japanese Patent Application Serial No. 2017-049054 (filed on Mar. 14, 2017), the contents of which are hereby incorporated by reference in their entirety.

TECHNICAL FIELD

The present invention relates to a fishing rod having a rod body with a fitting mounted thereon, a tubular body having the fitting mounted thereon, and a method for manufacturing them.

BACKGROUND

There is known a fishing rod having a rod body with a fitting such as a fishing line guide or a reel seat mounted thereon. Conventionally, such a fitting is mounted on a rod body by use of a thread or a resin sheet.

A fishing rod having a fitting mounted on a rod body by use of a thread is disclosed in, for example, Japanese Patent Application Publication No. 2008-263841 and Japanese Patent Application Publication No. 2004-194563.

Such a conventional fishing rod having a fitting mounted on a rod body by use of a thread is problematic in that a force applied from a fishing line or a reel to said fitting tends to loosen said thread.

A fishing rod having a fitting mounted on a rod body by use of a resin sheet is disclosed in, for example, Japanese Utility Model Application Publication No. S60-156963 and Japanese Utility Model Application Publication No. H2-26474. In these publications, a sheet made of a fiber-reinforced resin including a thermosetting resin is used as the resin sheet.

In mounting a fitting on a rod body by use of such a fiber-reinforced resin sheet, however, a thermosetting resin heated is once decreased in viscosity before starting to be cured and thus flows, so that a force for securing the fitting on the rod body by use of said sheet is temporarily weakened. As a result, the fitting deviates from its desired position or inclined in a circumferential direction on a surface of the rod body. Having found that such a problem might occur, the inventors of the present invention have made the present invention in order to solve the problem.

SUMMARY

It is one of the objects of the present invention to prevent or suppress deviation or inclination of a fitting on a surface of a rod body. The other objects of the present invention will be further apparent by referring to the entire description in this specification.

A fishing rod according to one embodiment of the present invention is provided with an elongated cylindrical rod body, a fitting having a mounting portion and mounted on an outer peripheral surface of the rod body via the mounting portion, a first layer formed by winding a first sheet so as to enclose both of the mounting portion and the rod body, the first sheet being made of a fiber-reinforced resin or a resin having a thermal shrinkage rate of 2.5% or lower measured pursuant to JIS K 7133, and a second layer formed by winding a second sheet on an outer side of the first sheet, the second sheet being made of a fiber-reinforced resin, wherein a temperature at which a loss tangent (tan δ) of the first sheet has a maximum value is different from a temperature at which a loss tangent (tan δ) of the second sheet has a maximum value, the loss tangent (tan δ) of the first sheet being calculated from dynamic viscoelasticity measurement at a frequency of 1 Hz, the loss tangent (tan δ) of the second sheet being calculated from dynamic viscoelasticity measurement at a frequency of 1 Hz.

In the fishing rod according to one embodiment of the present invention, the temperature at which the loss tangent (tan δ) of the first sheet has a maximum value is higher than the temperature at which the loss tangent (tan δ) of the second sheet has a maximum value.

In the fishing rod according to one embodiment of the present invention, the temperature at which the loss tangent (tan δ) of the first sheet has a maximum value is lower than the temperature at which the loss tangent (tan δ) of the second sheet has a maximum value.

In the fishing rod according to one embodiment of the present invention, the temperature at which the loss tangent (tan δ) of the first sheet has a maximum value is 10° C. or more higher than the temperature at which the loss tangent (tan δ) of the second sheet has a maximum value.

In the fishing rod according to one embodiment of the present invention, the temperature at which the loss tangent (tan δ) of the first sheet has a maximum value is 10° C. or more lower than the temperature at which the loss tangent (tan δ) of the second sheet has a maximum value.

In the fishing rod according to one embodiment of the present invention, the first sheet has a storage elastic modulus of 0.01 MPa to 10,000 Mpa at 80° C. to 140° C.

In the fishing rod according to one embodiment of the present invention, the first sheet is a sheet formed by impregnating fibers with a composition including a thermosetting resin, a simple resin sheet, or a resin sheet having an adhesive layer.

In the fishing rod according to one embodiment of the present invention, the second sheet is a sheet formed by impregnating glass fibers, carbon fibers, or resin fibers with a composition including a thermosetting resin.

In the fishing rod according to one embodiment of the present invention, the fitting is a fishing line guide.

In the fishing rod according to one embodiment of the present invention, the fitting is a reel seat.

A tubular body according to one embodiment of the present invention is provided with a cylindrical member having an elongated cylindrical shape, a fitting having a mounting portion and mounted on an outer peripheral surface of the cylindrical member via the mounting portion, a first layer formed by winding a first sheet so as to enclose both of the mounting portion and the cylindrical member, the first sheet being made of a fiber-reinforced resin or a resin having a thermal shrinkage rate of 2.5% or lower measured pursuant to JIS K 7133, and a second layer formed by winding a second sheet on an outer peripheral surface of the first sheet, the second sheet being made of a fiber-reinforced resin, wherein a temperature at which a loss tangent (tan δ) of the first sheet has a maximum value is different from a temperature at which a loss tangent (tan δ) of the second sheet has a maximum value, the loss tangent (tan δ) of the first sheet being calculated from dynamic viscoelasticity measurement at a frequency of 1 Hz, the loss tangent (tan δ)

of the second sheet being calculated from dynamic viscoelasticity measurement at a frequency of 1 Hz.

A method for manufacturing a tubular body according to one embodiment of the present invention includes steps of preparing a cylindrical member having an elongated cylindrical shape, disposing, on an outer peripheral surface of the cylindrical member, a fitting having a mounting portion, winding a first sheet so as to enclose both of the mounting portion and the cylindrical member, the first sheet being made of a fiber-reinforced resin or a resin having a thermal shrinkage rate of 2.5% or lower measured pursuant to JIS K 7133, winding a second sheet on an outer peripheral surface of the first sheet, the second sheet being made of a fiber-reinforced resin, and heating a winding obtained by following the foregoing steps so that the fitting is fixed to the cylindrical member, wherein a temperature at which a loss tangent (tan δ) of the first sheet has a maximum value is different from a temperature at which a loss tangent (tan δ) of the second sheet has a maximum value, the loss tangent (tan δ) of the first sheet being calculated from dynamic viscoelasticity measurement at a frequency of 1 Hz, the loss tangent (tan δ) of the second sheet being calculated from dynamic viscoelasticity measurement at a frequency of 1 Hz, and the step of heating includes heating the winding at a temperature within a range between and excluding the temperature at which the loss tangent (tan δ) of the first sheet has a maximum value and the temperature at which the loss tangent (tan δ) of the second sheet has a maximum value, the loss tangent (tan δ) of the first sheet being calculated from dynamic viscoelasticity measurement at a frequency of 1 Hz, the loss tangent (tan δ) of the second sheet being calculated from dynamic viscoelasticity measurement at a frequency of 1 Hz.

A fishing rod according to another one embodiment of the present invention is provided with an elongated cylindrical rod body, a fitting having a mounting portion and mounted on an outer peripheral surface of the rod body via the mounting portion, a first layer formed by winding a first sheet so as to enclose both of the mounting portion and the rod body, the first sheet being made of a fiber-reinforced resin, and a second layer formed by winding a second sheet on an outer side of the first sheet, the second sheet being made of a fiber-reinforced resin, wherein the first sheet is a sheet formed by impregnating fibers with a composition including a thermosetting resin, a simple resin sheet, or a resin sheet having an adhesive layer, and the second sheet is a sheet formed by impregnating glass fibers, carbon fibers, or resin fibers with a composition including a thermosetting resin.

A tubular body according to another one embodiment of the present invention is provided with a cylindrical member having an elongated cylindrical shape, a fitting having a mounting portion and mounted on an outer peripheral surface of the cylindrical member via the mounting portion, a first layer formed by winding a first sheet so as to enclose both of the mounting portion and the cylindrical member, and a second layer formed by winding a second sheet on an outer peripheral surface of the first sheet, the second sheet being made of a fiber-reinforced resin, wherein the first sheet is a sheet formed by impregnating fibers with a composition including a thermosetting resin or a sheet made of a resin having a thermal shrinkage rate of 2.5% or lower measured pursuant to JIS K 7133, and the second sheet is a sheet formed by impregnating glass fibers, carbon fibers, or resin fibers with a composition including a thermosetting resin.

A method for manufacturing a tubular body according to another one embodiment of the present invention includes steps of preparing a cylindrical member having an elongated cylindrical shape, disposing, on an outer peripheral surface of the cylindrical member, a fitting having a mounting portion, winding a first sheet so as to enclose both of the mounting portion and the cylindrical member, and winding a second sheet on an outer peripheral surface of the first sheet, the second sheet being made of a fiber-reinforced resin and heating a winding obtained by following the foregoing steps so that the fitting is fixed to the cylindrical member, wherein the first sheet is a sheet formed by impregnating fibers with a composition including a thermosetting resin, a simple resin sheet, or a resin sheet having an adhesive layer, and the second sheet is a sheet formed by impregnating glass fibers, carbon fibers, or resin fibers with a composition including a thermosetting resin. A method for manufacturing a tubular body.

Advantages

The fishing rod according to one embodiment of the present invention is intended to prevent or suppress deviation or inclination of a fitting on a surface of a rod body.

DESCRIPTION OF THE PREFERRED EMBODIMENTS

Figure 1:
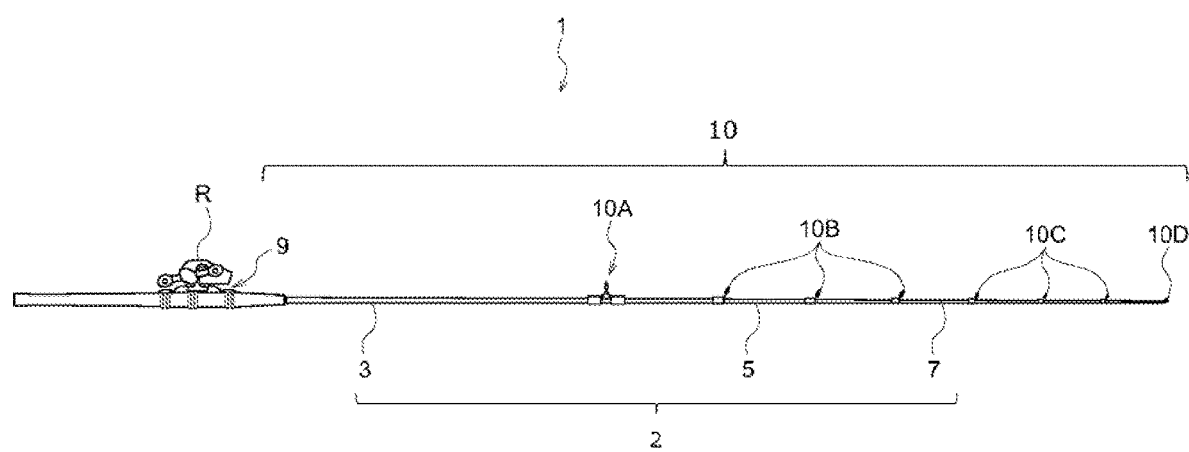
FIG. 1 is a view showing one embodiment of a fishing rod according to the present invention.

Embodiments of a fishing rod according to the present invention will now be specifically described with reference to the appended drawings. FIG. 1 is a view showing one embodiment of a fishing rod according to the present invention. A fishing rod 1 of this embodiment includes a butt-side rod section 3, an intermediate rod section 5, and a tip rod section 7 (each referred to also as a rod section), and these rod sections are ordinarily jointed to each other. Furthermore, in the fishing rod 1 of this embodiment, the butt-side rod section 3 is provided with a reel seat 9, and a fishing line guide for guiding a fishing line is attached at each appropriate location on the butt-side rod section 3, the intermediate rod section 5, and the tip rod section 7. The fishing line is released from a reel R mounted to the reel seat 9. In FIG. 1, a fishing line guide provided on the butt-side rod section 3 is denoted as 10A, a fishing line guide provided on the intermediate rod section 5 is denoted as 10B, and a fishing line guide provided on the tip rod section 7 is denoted as 10C. Furthermore, a top guide 10D is attached to a distal end of the tip rod section 7. In this case, the fishing line guides 10A to 10C and the reel seat 9 each constitute a fitting 10 secured on respective surfaces (outer peripheral surfaces) of the rod sections.

Preferably, the butt-side rod section 3, the intermediate rod section 5, and the tip rod section 7 are formed of a tubular body made of a fiber-reinforced resin and each formed in a tubular shape having predetermined dimensions in accordance with a conventional method. As the conventional method, for example, a fiber-reinforced resin prepreg (a prepreg sheet) is wound on a cored bar and subjected to a heating step, after which the cored bar is pulled out. The fiber-reinforced resin prepreg (the prepreg sheet) used in this case is formed by impregnating reinforcing fibers (mainly, carbon fibers, glass fibers, or the like) with a thermosetting synthetic resin such as an epoxy resin. These rod sections can be molded in various forms. For example, they can be formed in a solid structure or by jointing a tubular body to a solid core material (for example, a superelastic alloy wire rod or a superelastic resin material). A rod body 2 is configured by connecting together the butt-side rod section 3, the intermediate rod section 5, the tip rod section 7, and so on.

Figure 2:
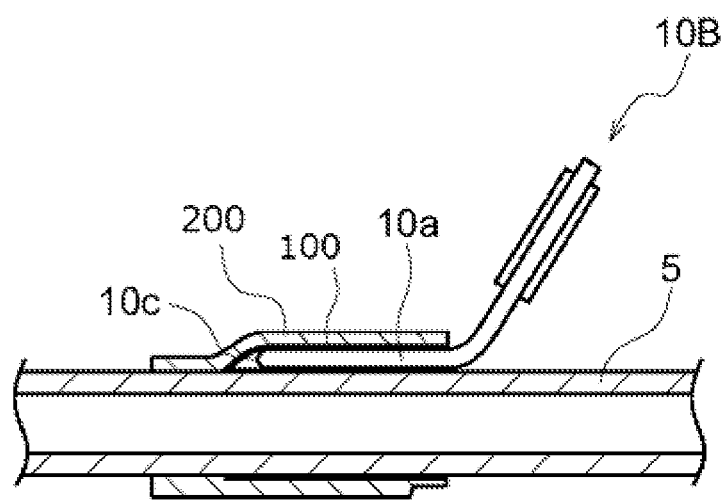
FIG. 2 is a schematic sectional view showing a secured state of a leg portion of a fishing line guide of the fishing rod shown in FIG. 1.
Figure 3:
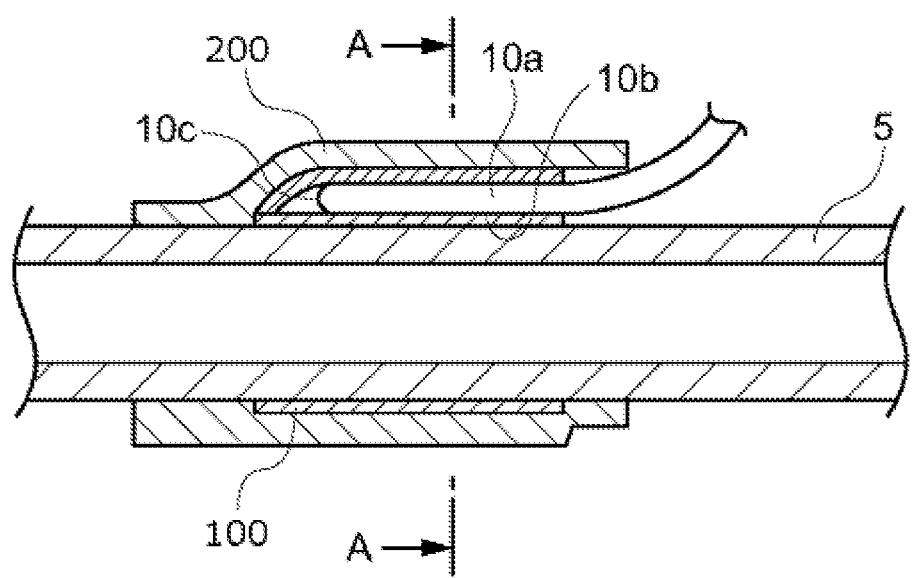
FIG. 3 is a sectional view showing a detailed configuration of a securing region shown in FIG. 2.
Figure 4:
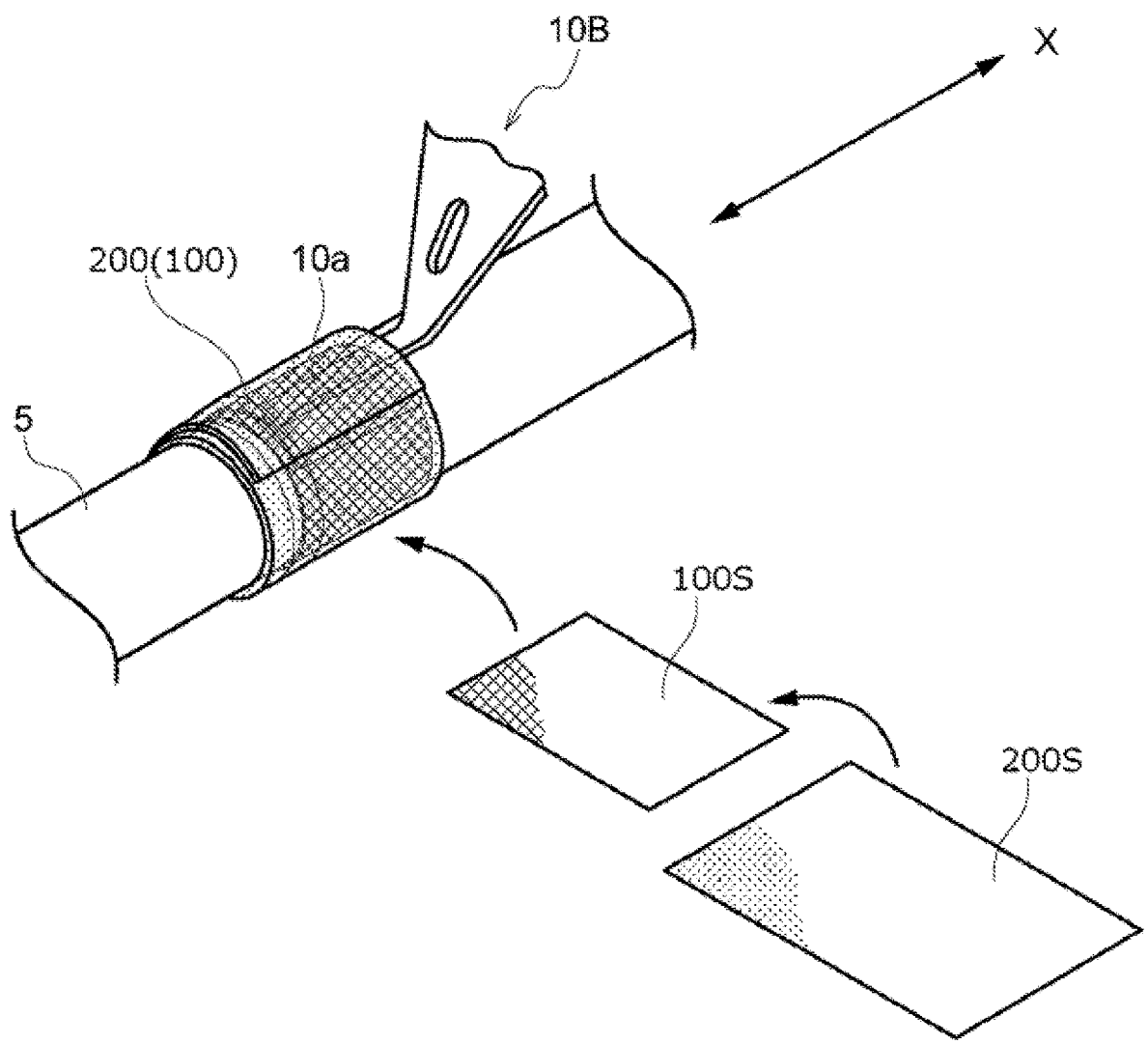
FIG. 4 is a schematic perspective view showing a configuration of prepreg sheets used to secure a securing portion of the fishing line guide to a rod.
Figure 5:
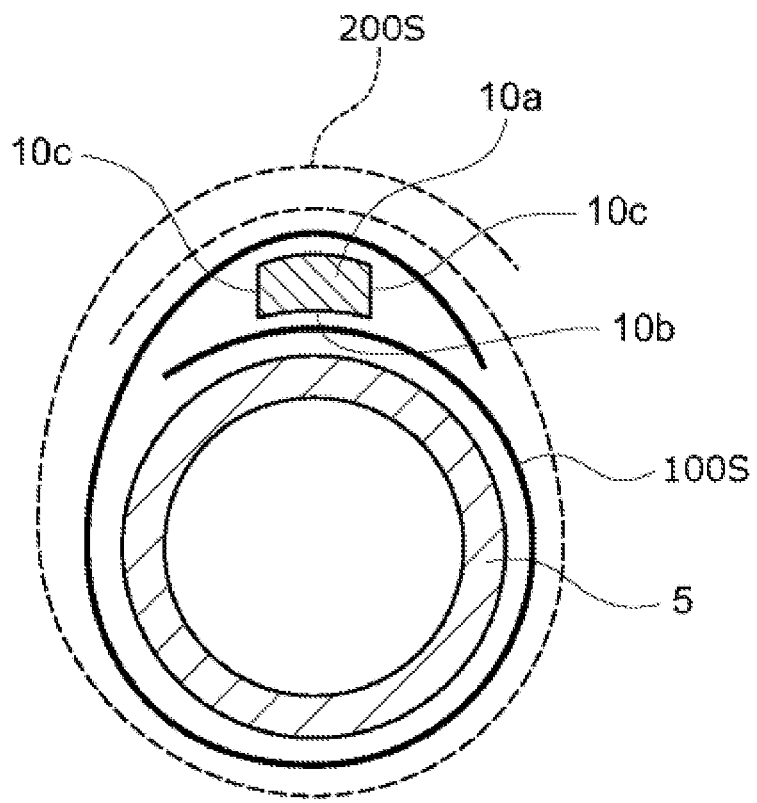
FIG. 5 is a sectional view along a line A-A in FIG. 3.

Respective outer surfaces of the rod sections configured as above have been surface-treated by painting or the like, and the above-described fitting 10 is mounted to the rod sections in this surface-treated state. By using the fishing line guide 10B as an example, the following describes a method for securing the fitting 10 and a securing structure thereof according to this embodiment. FIG. 2 to FIG. 5 are views for explaining a method for securing the fishing line guide 10B. To be more specific, FIG. 2 is a schematic sectional view showing a state of securing a securing portion (a leg portion) 10a of the fishing line guide 10B of the fishing rod 1 shown in FIG. 1, FIG. 3 is a sectional view showing a detailed configuration of a securing region shown in FIG. 2, FIG. 4 is a schematic perspective view showing a configuration of prepreg sheets used to secure the securing portion 10a of the fishing line guide 10B to the rod section 5, and FIG. 5 is a sectional view along a line A-A in FIG. 3.

As shown in FIG. 2, the securing portion 10a of the fishing line guide 10B, which is the fitting 10, is placed on a surface of the rod section (the intermediate rod section) 5 molded. Next, a first sheet 100S is wound on part of the rod section 5 so as to enclose the securing portion 10a and the outer peripheral surface of the rod section 5, thus forming a portion corresponding to a first layer 100. A second sheet 200S is wound on an outer peripheral surface of the first sheet 100S, thus forming a portion corresponding to a second layer 200. A winding thus obtained is heated so that the first layer 100 and the second layer 200 are formed, and thus the fishing line guide 10B is secured to the rod section 5. The securing portion 10a has a width smaller than a diameter of the rod section 5 and extends in a axial direction. A lower surface 10b thereof is a curved surface having a curvature different from that of a flat surface or the rod section 5. Because of this, a gap is generated between the lower surface 10b and the surface of the rod section 5.

In this embodiment, in securing the securing portion 10a in the above-described manner, as shown in FIG. 4 and FIG. 5, first, the first sheet 100S is wound on the rod section 5, and the securing portion 10a is placed so as to be interposed between overlapped portions of the first sheet 100S thus wound. Moreover, the second sheet 200S is wound on top of the wound first sheet 100S and secured by use of a fastening tape (not shown). A winding thus obtained in this state is put in a heating furnace so as to be heat-treated. A configuration may also be adopted in which the securing portion 10a is placed so as to be in direct contact with the surface of the rod section 5, after which the first sheet 100S is wound thereon so as to enclose the securing portion 10a and the outer peripheral surface of the rod section 5, and then the second sheet 200S is wound on top of the wound first sheet 100S.

In the fishing rod 1 according to one embodiment of the present invention, the first sheet 100S is a sheet made of a reinforced resin or a resin having a thermal shrinkage rate of 2.5% or lower measured pursuant to JIS K 7133. Furthermore, a temperature (a peak temperature) at which a loss tangent (tan δ) of the first sheet 100S has a maximum value is different from a temperature (a peak temperature) at which a loss tangent (tan δ) of the second sheet 200S has a maximum value, the loss tangent (tan δ) of the first sheet being calculated from dynamic viscoelasticity measurement at a frequency of 1 Hz, the loss tangent (tan δ) of the second sheet being calculated from dynamic viscoelasticity measurement at a frequency of 1 Hz. In the dynamic viscoelasticity measurement, by using a dynamic viscoelasticity measurement device (in this specification, an ARES rheometer manufactured by TA Instruments), respective values of a dynamic viscoelasticity of the first sheet 100S and the second sheet 200S are measured and used for the calculation. Conditions for this measurement are as follows: the measurement is performed in a shear mode or a tension mode, a rate of temperature increase is set to 5° C./min, a measurement range is set to 80° C. to 100° C., and a measurement frequency is set to 1 Hz. The first sheet 100S does not thermally shrink to an excessive degree, and a loss tangent peak temperature of the first sheet 100S is different from a loss tangent peak temperature of the second sheet 200S, and thus at the time of heating, a decrease in flowability or elasticity of a resin included in the first sheet 100S and that of a resin included in the second sheet 200S do not become maximum at the same time, so that deviation or inclination of the fitting 10 can be prevented or suppressed. A loss tangent peak temperature of the first sheet 100S can be made different from a loss tangent peak temperature of the second sheet 200S by, for example, adopting, as the resin included in the first sheet 100S, a resin having a value of a glass transition temperature or a curing start temperature different from that of the resin included in the second sheet 200S. As the resin having a thermal shrinkage rate of 2.5% or lower measured pursuant to JIS K 7133, for example, polyimide, polyethylene terephthalate, or the like can be used. The sheet made of the resin having a thermal shrinkage rate of 2.5% or lower may have an adhesive layer or a pressure-sensitive adhesive layer. Furthermore, the adhesive layer or the pressure-sensitive adhesive layer may be provided on entire one surface of said sheet or on one surface thereof only at a winding start position and a winding end position (namely, both end portions) of the first sheet 100S.

In the fishing rod 1 according to one embodiment of the present invention, a temperature at which a loss tangent of the first sheet 100S has a maximum value is higher than a temperature at which a loss tangent of the second sheet 200S has a maximum value. That is, the second sheet 200S disposed on an outer side and the first sheet 100S disposed on an inner side are configured so that at the time of heating, a loss tangent of the second sheet 200S starts to decrease at a temperature lower than a temperature at which a loss tangent of the first sheet 100S starts to decrease. Thus, at the time of heating, a decrease in flowability of the resin included in the second sheet 200S disposed on the outer side occurs earlier than a decrease in flowability of the resin included in the first sheet 100S disposed on the inner side, so that the second layer 200 is formed first. With this configuration, it is possible to prevent or suppress occurrence of deviation or inclination of the fitting 10 due to excessive flowing of the resin included in the first sheet 100S. A loss tangent peak temperature of the first sheet 100S can be made higher than a loss tangent peak temperature of the second sheet 200S by, for example, adopting, as the resin included in the first sheet 100S, a resin having a value of a glass transition temperature or a curing start temperature higher than that of the resin included in the second sheet 200S.

In the fishing rod 1 according to one embodiment of the present invention, a loss tangent peak temperature of the first sheet 100S is 10° C. or more higher than a loss tangent peak temperature of the second sheet 200S. This difference in peak temperature is preferably 11° C. or more, more preferably 12° C. or more, still more preferably 13° C. or more, and most preferably 14° C. or more. When a winding formed of the first sheet 100S and the second sheet 200S having such respective loss tangent peak temperatures is heated, first, there occurs a decrease in flowability of the resin included in the second sheet 200S disposed on the outer side, so that the second layer 200 is formed. Next, there occurs an increase in flowability of the resin included in the first sheet 100S disposed on the inner side, and thus the resin fills a gap between the rod body 2 and the fitting 10. Next, there occurs a decrease in flowability of the resin included in the first sheet 100S, so that the first layer 100S is formed. This makes it possible to exert an effect of firmly securing the fitting 10 to the rod body 2 by filling a gap between the rod body 2 and the fitting 10. It is also possible to exert an effect of more reliably preventing or suppressing deviation or inclination of the fitting 10 due to leakage of the resin from the first sheet 100S.

In the fishing rod 1 according to one embodiment of the present invention, a temperature at which a loss tangent of the first sheet 100S has a maximum value is lower than a temperature at which a loss tangent of the second sheet 200S has a maximum value. That is, the first sheet 100S disposed on the inner side and the second sheet 200S disposed on the outer side are configured so that at the time of heating, a loss tangent of the first sheet 100S starts to decrease at a temperature lower than a temperature at which a loss tangent of the second sheet 200S starts to decrease. Thus, at the time of heating, a decrease in flowability of the resin included in the first sheet 100S disposed on the inner side occurs earlier than a decrease in flowability of the resin included in the second sheet 200S disposed on the outer side, so that the first layer 100 is formed first. With this configuration, it is possible to prevent or suppress occurrence of deviation or inclination of the fitting 10 due to leakage of the resin included in the first sheet 100S. A loss tangent peak temperature of the first sheet 100S can be made lower than a loss tangent peak temperature of the second sheet 200S by, for example, adopting, as the resin included in the first sheet 100S, a resin having a value of a glass transition temperature or a curing start temperature lower than that of the resin included in the second sheet 200S.

In the fishing rod 1 according to one embodiment of the present invention, a loss tangent peak temperature of the first sheet 100S is 10° C. or more lower than a loss tangent peak temperature of the second sheet 200S. This difference in peak temperature is preferably 11° C. or more, more preferably 12° C. or more, still more preferably 13° C. or more, and most preferably 14° C. or more. When a winding formed of the first sheet 100S and the second sheet 200S having such respective loss tangent peak temperatures is heated, first, there occurs a decrease in flowability of the resin included in the first sheet 100S disposed on the inner side, so that the first layer 100 is formed. Next, there occurs an increase in flowability of the resin included in the second sheet 200S disposed on the outer side. Next, there occurs a decrease in flowability of the resin included in the second sheet 200S, so that the second layer 200S is formed. This makes it possible to exert the effect of firmly securing the fitting 10 to the rod body 2 by filling a gap between the rod body 2 and the fitting 10. It is also possible to exert the effect of more reliably preventing or suppressing deviation or inclination of the fitting 10 due to leakage of the resin from the first sheet 100S.

Figure 6:
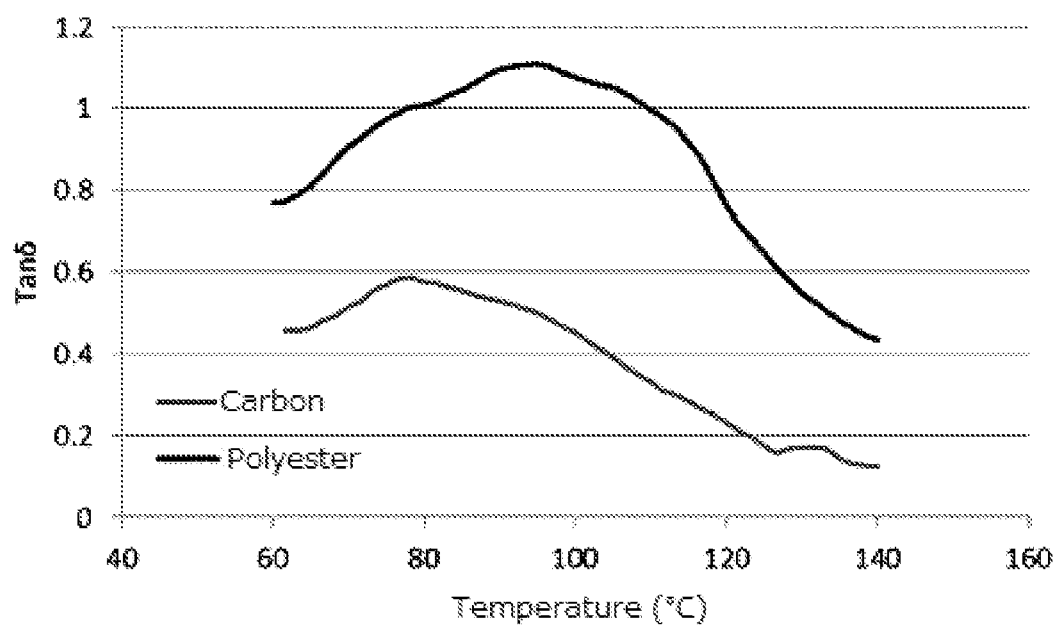
FIG. 6 is a graph showing a loss tangent peak temperature of each of a first sheet 100S and a second sheet 200S used to form the fishing rod shown in FIG. 1.

In the fishing rod 1 according to one embodiment of the present invention, a temperature at which a loss tangent (tan δ) of the first sheet 100S has a maximum value is higher than a temperature at which a loss tangent (tan δ) of the second sheet 200S has a maximum value, and FIG. 6 shows a specific example of this. In FIG. 6, an upper line represents a loss tangent of the first sheet 100S, and a lower line represents a loss tangent of the second sheet 200S. For example, when a winding formed by winding the first sheet 100S and the second sheet 200S is heated to 120° C., first, there occurs a decrease in flowability of the resin included in the second sheet 200S disposed on the outer side, so that the second layer 200 starts to be formed. At this time, flowability of the resin included in the first sheet 100S disposed on the inner side starts to increase, and thus the resin starts to fill a gap between the rod body 2 and the fitting 10. Due to presence of the second layer 200, however, there occurs no excessive flowing of the resin included in the first sheet 100S. Next, a heating temperature is maintained at 120° C. or increased to a temperature higher than 120° C., and thus there occurs a decrease in flowability of the resin included in the first sheet 100S, so that the first layer 100S is formed. This makes it possible to exert both of the effect of achieving firm securing by filling a gap between the rod body 2 and the fitting 10 and the effect of preventing or suppressing deviation or inclination of the fitting 10.

In the fishing rod 1 according to one embodiment of the present invention, in order to exert the above-mentioned effects, it is only required that the second layer 200 be present on an outer side of the first layer 100, and an additional layer (for example, a painting layer) may be present on an outer side of the second layer 200 or an additional layer (for example, an anchor layer for improving adhesion) may be present between the second layer 200 and the first layer 100.

In the fishing rod 1 according to one embodiment of the present invention, preferably, a loss tangent peak temperature of the first sheet 100S is set based on the above-mentioned relative relationship with a loss tangent peak temperature of the second sheet 200S. An absolute value thereof is, for example, preferably 60° C. to 130° C., more preferably 70° C. to 120° C., and most preferably 75° C. to 110° C. A loss tangent peak temperature of the first sheet 100S can be set to fall within such a range by, for example, appropriately selecting a type of the resin included in the first sheet 100S.

In the fishing rod 1 according to one embodiment of the present invention, preferably, a loss tangent peak temperature of the second sheet 200S is set based on the above-mentioned relative relationship with a loss tangent peak temperature of the first sheet 100S. An absolute value thereof is, for example, preferably 65° C. to 120° C., more preferably 70° C. to 110° C., and most preferably 75° C. to 100° C. A loss tangent peak temperature of the second sheet 200S can be set to fall within such a range by, for example, appropriately selecting a type of the resin included in the second sheet 200S.

In one embodiment of the present invention, heating can be performed by putting the rod section 5 (the rod body 2) in a heating furnace maintained at a predetermined temperature. The temperature used in this case is not particularly limited and may be, for example, 70° C. to 160° C. This temperature is more preferably 80° C. to 150° C., still more preferably 85° C. to 120° C., and most preferably 90° C. to 110° C. A duration of this heating in the heating furnace maintained at a predetermined temperature is not particularly limited and can be set to, for example, 5 minutes to 3 hours, more preferably 15 minutes to 2.5 hours, and still more preferably 30 minutes to 2 hours.

In the fishing rod 1 according to one embodiment of the present invention, the first sheet 100S has a storage elastic modulus of 0.01 MPa to 10,000 Mpa or less at 80° C. to 140° C. A storage elastic modulus mentioned here refers to a cosine component of a phase angle δ of a dynamic complex elastic modulus obtained when the first sheet 100S and the second sheet 200S are deformed by using a dynamic viscoelasticity measurement device (in this specification, an ARES rheometer manufactured by TA Instruments). Conditions for this measurement are as follows: the measurement is performed in a shear mode or a tension mode, a rate of temperature increase is set to 5° C./min, a measurement range is set to 50° C. to 140° C., and a measurement frequency is set to 1 Hz. The first sheet 100S has a storage elastic modulus of preferably 0.02 MPa to 8,000 Mpa and more preferably 0.03 MPa to 6,000 Mpa. With a storage elastic modulus of the first sheet 100S falling within the above-described range, even when the second sheet 200S is heated to a high temperature so as to be cured, the storage elastic modulus is maintained at a predetermined value or higher, and thus a tension used to hold down the fitting 10 can be maintained within a predetermined range. For this reason, it is possible to prevent or suppress occurrence of deviation or inclination of the fitting 10. The first sheet 100S could be set to have such a storage elastic modulus by, for example, appropriately selecting respective types of the fibers and resin included in the first sheet 100S.

In the fishing rod 1 according to one embodiment of the present invention, preferably, a ratio of a maximum value to a minimum value of a storage elastic modulus of the first sheet 100S is 50 times or less at a temperature in a range of 80° C. to 140° C. This ratio is more preferably 40 times or less, still more preferably 30 times or less, and most preferably 27 times or less. With the above-described ratio falling within the above-described preferable range, at the time of heating for curing the second sheet 200S, a variation in storage elastic modulus of the first sheet 100S falls within a predetermined range, and thus a tension used to hold down the fitting 10 by the first sheet 100S can be maintained within a predetermined range. For this reason, it is possible to prevent or suppress occurrence of deviation or inclination of the fitting 10. The first sheet 100S could be set to have such a storage elastic modulus by, for example, appropriately selecting respective types of the fibers and resin included in the first sheet 100S.

In the fishing rod 1 according to one embodiment of the present invention, a storage elastic modulus of the second sheet 200S at 80° C. to 140° C. is not particularly limited and is, for example, 0.01 MPa to 100 Mpa. A storage elastic modulus mentioned here is a value obtained by measurement performed in a similar manner to the case of the first sheet 100S. A storage elastic modulus of the second sheet 200S is preferably 0.02 MPa to 80 MPa and more preferably 0.03 MPa to 60 MPa. The second sheet 200S could be set to have such a storage elastic modulus by, for example, appropriately selecting respective types of the fibers and resin included in the second sheet 200S.

In this embodiment, the first sheet 100S is a prepreg sheet or a resin sheet. The prepreg sheet is formed by impregnating fibers made of a resin with a composition including a thermosetting resin. Fibers used to form the prepreg sheet are made of a fiber-reinforced resin using carbon fibers, glass fibers, or the like or any of synthetic resins such as polyolefin, polyamide, polyacrylonitrile, polyester, and so on. Among these, preferable are synthetic resins. Among these types of synthetic resins, preferable is polyester. A thermosetting resin refers to a resin of a type that is irreversibly cured by a chemical reaction when heated. As a thermosetting resin, for example, an urea resin, a melamine resin, a phenol resin, an epoxy resin, an unsaturated polyester resin, an alkyd resin, and a urethane resin can be used, and among these, preferable is an epoxy resin. A thickness of the first sheet 100S is not particularly limited and may be, for example, 20 μm to 300 μm. An appropriate commercially available sheet can also be used as the first sheet 100S.

The first sheet 100S may be a simple resin sheet. The simple resin sheet is made of a resin having a thermal shrinkage rate of 2.5% or lower, such as, for example, polyimide, polyamideimide, polyethylene naphthalate, polyethylene terephthalate, polymethyl methacrylate, a fluorine resin (PTFE, PFA, FEP, or the like). The thermal shrinkage rate is preferably 1.0% or lower and more preferably 0.5% or lower. The first sheet 100S may be a resin sheet having a pressure-sensitive adhesive layer. As the pressure-sensitive adhesive layer, there can be used a known type such as an acrylic-based, urethane-based, or silicone-based pressure-sensitive adhesive layer. The first sheet 100S may include a layer of non-woven fabric. As a material of the non-woven fabric, for example, nylon, polyester (for example, PET), acrylic fibers, aramid fibers, or glass fibers can be used.

In this embodiment, the second sheet 200S is a prepreg sheet formed by impregnating fibers made of a reinforcing material with a composition including a thermosetting resin. Reinforcing fibers used are carbon fibers, glass fibers, or resin fibers such as of polyester. Among these, preferable are carbon fibers or glass fibers. As the thermosetting resin included in the composition impregnated into the second sheet 200S, for example, an urea resin, a melamine resin, a phenol resin, an epoxy resin, an unsaturated polyester resin, an alkyd resin, and a urethane resin can be used. A curing temperature of the thermosetting resin included in the composition impregnated into the second sheet 200S is lower than a curing temperature of the thermosetting resin included in the composition impregnated into the first sheet 100S. For example, in a case where the first sheet 100S is impregnated with a composition including an epoxy resin of a type that is cured at 120° C., the second sheet 200S can be impregnated with a composition including an epoxy resin of a type that is cured at 80° C. A thickness of the second sheet 200S is not particularly limited and may be, for example, 20 μm to 300 μm. An appropriate commercially available sheet can also be used as the second sheet 200S.

The composition impregnated into the first sheet 100S or the second sheet 200S is a composition composed primarily of a thermosetting resin and may include a known additive or the like. In a case where said composition includes a thermosetting resin and an additive, preferably, the thermosetting resin has a mass of 50% or higher where a total mass of said composition is assumed to be 100%. A content of the thermosetting resin in the composition may be 60% or higher, 70% or higher, 80% or higher, or 90% or higher.

An amount of the thermosetting resin included in the prepreg sheet as the first sheet 100S is preferably 50% by mass or higher where a total mass of the reinforcing fibers and the thermosetting resin in the first sheet 100S is assumed to be 100% by mass. This amount is more preferably 60% by mass.

An amount of the thermosetting resin included in the second sheet 200S is preferably 20% by mass to 50% by mass where a total mass of the reinforcing fibers and the thermosetting resin in the second sheet 200S is assumed to be 100% by mass. This amount is more preferably 30% by mass to 40% by mass.

The first sheet 100S and the second sheet 200S can also be formed of a resin sheet simply made of a thermosetting resin as a base material. Alternatively, the first sheet 100S may be a sheet simply made of a thermoplastic resin. However, when consideration is given to strength for securing the fitting 10 to the rod body 2, stability in resin flow, an improvement in durability, and an improvement in workability (a resin sheet tends to be deformed or damaged in the course of work), preferably, a prepreg sheet is as a material used to secure the fitting 10. Although it is possible that only either one of the first sheet 100S and the second sheet 200S is a prepreg sheet, preferably, both of the first sheet 100S and the second sheet 200S are prepreg sheets.

As the second sheet 200S, in consideration of strength, flaw resistance, and so on, preferably, there is used a sheet in which fibers are arranged regularly in a direction at a predetermined angle with respect to an extending direction of the rod body 2 (for example, a sheet in which fibers are arranged regularly so as to be inclined at 45° with respect to an axial direction X (see FIG. 4), or a sheet in which fibers are plain-woven and inclined at a predetermined angle (for example, 45°) so as to further facilitate winding). As the first sheet 100S, preferably, there is used a sheet in which fibers are plain-woven (for example, a sheet in which fibers are oriented at an angle of 0° and an angle of 90° with respect to the axial direction X (see FIG. 4)) so as to facilitate winding and make it unlikely that the fibers are displaced). Respective orientation directions of the fibers included in the first sheet 100S and the second sheet 200S, however, are not limited thereto.

The first sheet 100S may be used by being cut into one ply or less and placed on a surface of the rod body 2 or by being cut into one ply or more and wound on the rod section 5. Winding the first sheet 100S on the rod section 5 in two plies or more leads to a weight increase and makes it not easy to wind the first sheet 100S. Because of this, as shown in FIG. 5, preferably, the number of plies of the first sheet 100S wound is set to two or less, and the securing portion 10a of the fishing line guide 10B is interposed between overlapped portions of the first sheet 100S after being wound in one ply. That is, with the securing portion 10a interposed between the overlapped portions, the fishing line guide 10B can be stably brought to a secured state, and thus improved workability can be achieved. The number of plies of the first sheet 100S wound, however, is not limited to the above-described number.

While the fishing rod 1 shown in FIG. 1 is configured to be an ordinarily jointed type, a joint structure of the rod sections may be a telescopic type, an inversely jointed type, or a socket-and-spigot jointed type. Furthermore, there may be a plurality of (two or more) intermediate rod sections 5 or no intermediate rod sections 5. Furthermore, the fishing rod 1 may be formed of a single rod as a whole. Furthermore, the fitting 10 is not limited to a fishing line guide, and the above-described method for securing the fitting 10 can be applied also to a case of securing the reel seat 9 shown in FIG. 1.

EXAMPLES

Table 1 below shows preferred examples of the first sheet 100S and the second sheet 200S for forming the first layer 100 and the second layer 200, respectively, in the fishing rod 1 according to one embodiment of the present invention. In an item "Deviation of Guide" in Table 1, "F" indicates a case where there are one or more fittings 10 each, after being heated, deviating on a circumference of the fishing rod 1 at an angle corresponding to 1° or more of the circumference from a position where the each of one or more fittings 10 is installed before being heated, and "G" indicates a case where there are no such fittings 10.

TABLE 1

|  |  | Example 1 | Example 2 | Example 3 | Example 4 |
|---|---|---|---|---|---|
| Material | First Sheet (Inner Layer) | Polyester Prepreg | Carbon Prepreg | Polyimide Film | PET Film |
|  | Second Sheet (Outer Layer) | Carbon Prepreg | Polyester Prepreg | Carbon Prepreg | Carbon Prepreg |
| Thickness (mm) | First Sheet (Inner Layer) | 0.10 | 0.17 | 0.03 | 0.05 |
|  | Second Sheet (Outer Layer) | 0.17 | 0.10 | 0.17 | 0.17 |
| Storage Elastic Modulus Measurement Mode | First Sheet (Inner Layer) | Shear | Shear | Tension | Tension |
|  | Second Sheet (Outer Layer) | Shear | Shear | Shear | Shear |
| Storage Elastic Modulus (MPa) at 80° C. to 140° C. | First Sheet (Inner Layer) | $3 \times 10^{-2} \sim 8 \times 10^{-1}$ | $1 \times 10^{0} \sim 5 \times 10^{1}$ | $2 \times 10^{3} \sim 4 \times 10^{3}$ | $8 \times 10^{2} \sim 6 \times 10^{3}$ |
|  | Second Sheet (Outer Layer) | $1 \times 10^{0} \sim 5 \times 10^{1}$ | $3 \times 10^{-2} \sim 8 \times 10^{-2}$ | $1 \times 10^{2} \sim 5 \times 10^{3}$ | $1 \times 10^{0} \sim 5 \times 10^{1}$ |
| Tanδ Peak Temp. (° C.) Measurement Temp.: 50° C. to 140° C. | First Sheet (Inner Layer) | 98 | 78 | 73 | 114 |
|  | Second Sheet (Outer Layer) | 78 | 98 | 78 | 78 |
| Value (° C.) Obtained by Subtracting Tanδ Peak Temp. |  | 20 | −20 | −5 | 16 |

TABLE 1-continued

|  |  |  | | | |
|---|---|---|---|---|---|
| Termal Shrinkage Rate (%) at 125° C. MD Direction | of Outer Layer from Tanδ Peak Temp. of Inner Layer First Sheet | — | — | Lower Than 0.2 | 2.5 or Lower |
| Deviation of Guide |  | G | G | G | G |

| | | | Com. Ex. 1 | Com. Ex. 2 | Com. Ex. 3 |
|---|---|---|---|---|---|
| Material | First Sheet (Inner Layer) | | Carbon Prepreg | Polyester Prepreg | Soft Polyvinyl Chrolide Film |
|  | Second Sheet (Outer Layer) | | Carbon Prepreg | Polyester Prepreg | Carbon Prepreg |
| Thickness (mm) | First Sheet (Inner Layer) | | 0.17 | 0.10 | 0.03 |
|  | Second Sheet (Outer Layer) | | 0.17 | 0.10 | 0.17 |
| Storage Elastic Modulus Measurement Mode | First Sheet (Inner Layer) | | Shear | Shear | Tension |
|  | Second Sheet (Outer Layer) | | Shear | Shear | Shear |
| Storage Elastic Modulus (MPa) at 80° C. to 140° C. | First Sheet (Inner Layer) | | $1 \times 10^0 \sim 5 \times 10^1$ | $3 \times 10^{-2} \sim 8 \times 10^{-3}$ | $1 \times 10^0 \sim 8 \times 10^0$ |
|  | Second Sheet (Outer Layer) | | $1 \times 10^0 \sim 5 \times 10^3$ | $3 \times 10^{-2} \sim 8 \times 10^{-2}$ | $1 \times 10^0 \sim 5 \times 10^1$ |
| Tanδ Peak Temp. (° C.) Measurement Temp.: 50° C. to 140° C. | First Sheet (Inner Layer) | | 78 | 98 | 54 |
|  | Second Sheet (Outer Layer) | | 78 | 98 | 78 |
| Value (° C.) Obtained by Subtracting Tanδ Peak Temp. of Outer Layer from Tanδ Peak Temp. of Inner Layer | | | 0 | 0 | −24 |
| Termal Shrinkage Rate (%) at 125° C. MD Direction | First Sheet | | — | — | 12 |
| Deviation of Guide | | | F | F | F |

Thermal Shrinkage Rate Measured Pursuant to JIS K 7133

Figure 7:
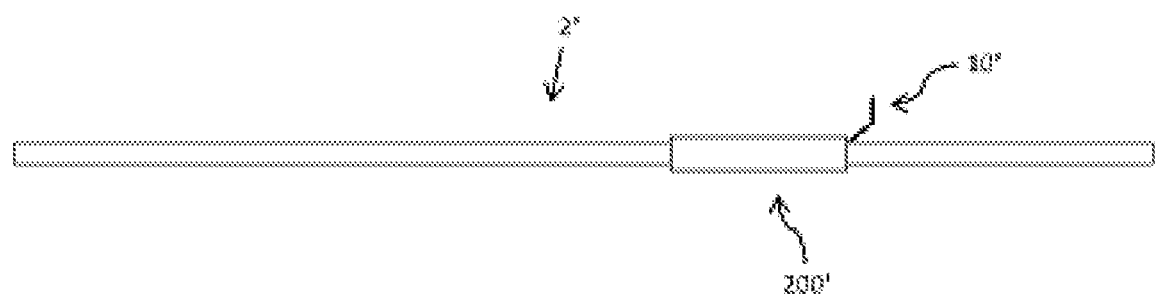
FIG. 7 is a view showing one embodiment of a tubular body according to the present invention.

The present invention relates also to a tubular body 2' having a cylindrical member. As shown in FIG. 7, the tubular body 2' has an elongated cylindrical shape. In the tubular body 2', a fitting 10' is secured by use of a second layer 200' and a first layer (this layer is present on an inner side of the second layer 200' and thus is not shown in FIG. 7). A tubular body according to one embodiment of the present invention may be, for example, a member (a rod section) used as part of the fishing rod 1, such as the butt-side rod section 3, the intermediate rod section 5, or the tip rod section 7. The tubular body 2' as part of a fishing rod does not have a complete function as a single fishing rod. Except for this, the tubular body 2' may have a configuration similar to a specific configuration of the fishing rod 1 shown in FIGS. 2 to 5 and explained in the corresponding description. Furthermore, the tubular body 2' according to one embodiment of the present invention is applicable to any use requiring a tubular body having flexibility. The tubular body 2' according to one embodiment of the present invention can exert an effect of enabling efficient replacement of a fitting regardless of its use.

The dimensions, materials, and arrangements of the various constituent components described in this specification are not limited to those explicitly described in the embodiments, and the various constituent components can be modified to have any dimensions, materials, and arrangements within the scope of the present invention. Furthermore, constituent components not explicitly described in this specification can also be added to the embodiments described, and some of the constituent components described in the embodiments can also be omitted.

What is claimed is:

1. A fishing rod, comprising:
   an elongated cylindrical rod body;
   a fitting having a mounting portion and mounted on an outer peripheral surface of the rod body via the mounting portion;
   a first layer formed by winding a first sheet so as to enclose both of the mounting portion and the rod body, the first sheet being made of a fiber-reinforced resin or a resin having a thermal shrinkage rate of 2.5% or lower measured pursuant to JIS K 7133; and
   a second layer formed by winding a second sheet on an outer side of the first sheet, the second sheet being made of a fiber-reinforced resin,
   wherein a temperature at which a loss tangent (tan δ) of the first sheet has a maximum value is different from a temperature at which a loss tangent (tan δ) of the second sheet has a maximum value, the loss tangent (tan δ) of the first sheet being calculated from dynamic viscoelasticity measurement at a frequency of 1 Hz, the loss tangent (tan δ) of the second sheet being calculated from dynamic viscoelasticity measurement at a frequency of 1 Hz.

2. The fishing rod according to claim 1, wherein the temperature at which the loss tangent (tan δ) of the first sheet has a maximum value is higher than the temperature at which the loss tangent (tan δ) of the second sheet has a maximum value.

3. The fishing rod according to claim 1, wherein the temperature at which the loss tangent (tan δ) of the first sheet has a maximum value is lower than the temperature at which the loss tangent (tan δ) of the second sheet has a maximum value.

4. The fishing rod according to claim 1, wherein the temperature at which the loss tangent (tan δ) of the first sheet has a maximum value is 10° C. or more higher than the temperature at which the loss tangent (tan δ) of the second sheet has a maximum value.

5. The fishing rod according to claim 1, wherein the temperature at which the loss tangent (tan δ) of the first sheet has a maximum value is 10° C. or more lower than the temperature at which the loss tangent (tan δ) of the second sheet has a maximum value.

6. The fishing rod according to claim 1, wherein the first sheet has a storage elastic modulus of 0.01 MPa to 10,000 Mpa at 80° C. to 140° C.

7. The fishing rod according to claim 1, wherein the first sheet is a sheet formed by impregnating fibers with a composition including a thermosetting resin, a simple resin sheet, or a resin sheet having an adhesive layer.

8. The fishing rod according to claim 1, wherein the second sheet is a sheet formed by impregnating glass fibers, carbon fibers, or resin fibers with a composition including a thermosetting resin.

9. The fishing rod according to claim 1, wherein the fitting is a line guide.

10. The fishing rod according to claim 1, wherein the fitting is a reel seat.

* * * * *